United States Patent [19]

Huggard

[11] Patent Number: 4,466,933
[45] Date of Patent: Aug. 21, 1984

[54] HEAT-RESISTANT FOAMED PLASTIC MATERIALS

[75] Inventor: Mark T. Huggard, Mechanicsville, Va.

[73] Assignee: Mobil Oil Corporation, New York, N.Y.

[21] Appl. No.: 568,151

[22] Filed: Jan. 4, 1984

Related U.S. Application Data

[63] Continuation-in-part of Ser. No. 454,202, Dec. 28, 1982.

[51] Int. Cl.$^3$ .......................... B29H 7/20; C08J 9/02
[52] U.S. Cl. ..................................... 264/54; 264/234; 264/321; 264/DIG. 5; 425/817 C; 521/77; 521/79; 521/81; 521/138; 521/918
[58] Field of Search ........... 264/54, 234, 321, DIG. 5; 521/77, 79, 81, 138

[56] References Cited

U.S. PATENT DOCUMENTS 3,470,114  9/1969  Siggel et al. ................. 521/138
4,127,631  11/1978  Dempsey et al. ............. 528/271

Primary Examiner—Morton Foelak
Attorney, Agent, or Firm—Alexander J. McKillop; Michael G. Gilman; Stanislaus Aksman

[57] ABSTRACT

There are provided methods for making heat-resistant, foamed, crystalline plastic materials. For example, polyethylene terephthalate may be foamed with a polycarbonate, extruded into a foamed sheet and this foamed sheet may be thermoformed by being subjected to crystallization annealing. The thermoformed, foamed, crystalline plastic sheets prepared by this process are particularly useful for forming light weight, ovenable food containers.

12 Claims, 2 Drawing Figures

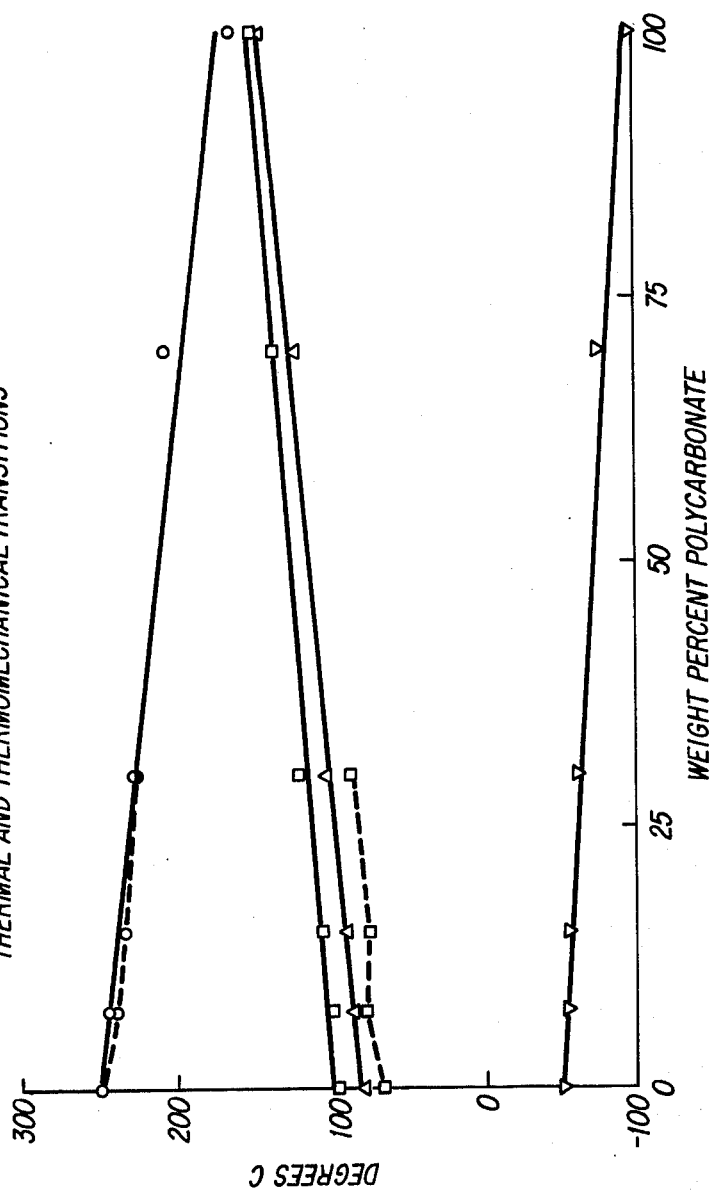

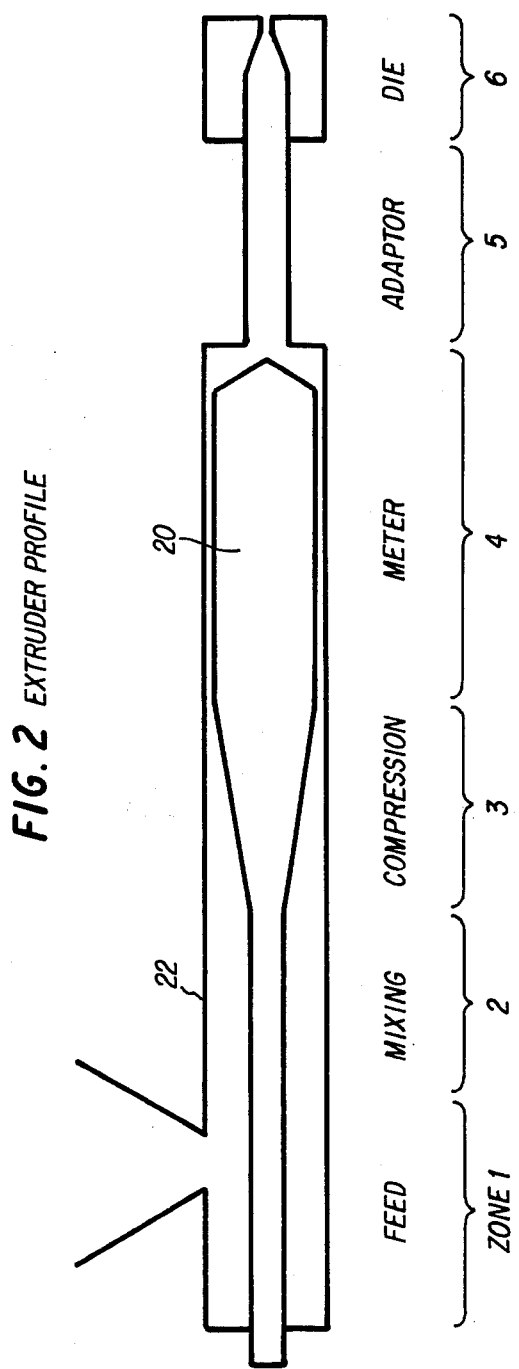
FIG. 2 EXTRUDER PROFILE

HEAT-RESISTANT FOAMED PLASTIC MATERIALS

CROSS REFERENCE TO RELATED APPLICATION

This application is a continuation-in-part of applicant's copending U.S. application Ser. No. 454,202, filed Dec. 28, 1982, the entire disclosure of which is expressly incorporated herein by reference.

BACKGROUND OF THE INVENTION

This invention relates to thermoformed, heat-resistant, foamed, crystalline plastic materials which are particularly useful as light weight, ovenable food containers.

The Siggel et al U.S. Pat. No. 3,470,114 the entire disclosure of which is expressly incorporated herein by reference, describes the formation of amorphous, foamed plastics which may be shaped by various techniques such as injection molding. These plastics are essentially composed of the reaction product of a polyester with a polycarbonate. However, objects formed from this material tend to deform at elevated temperatures due to the amorphous nature of the plastic.

The Dempsey et al U.S. Pat. No. 4,127,631, the entire disclosure of which is also expressly incorporated herein by reference, describes a non-foamed, thermoformed polyester sheet material. However, as compared with foamed polyester, this non-foamed material has a relatively high density.

SUMMARY OF THE INVENTION

According to an aspect of the invention there is provided a process for preparing a thermoformed, foamed, crystalline, plastic sheet, said sheet being essentially composed of the foamed reaction product of a polyester and a polycarbonate, said process comprising the steps of:

(i) introducing into an extruder a mixture consisting essentially of:
(a) a high molecular weight linear polyester, which is a polycondensation product of an aromatic dicarboxylic acid and a glycol; and
(b) a high molecular weight linear aromatic polycarbonate represented by a repeating structural unit of the formula:

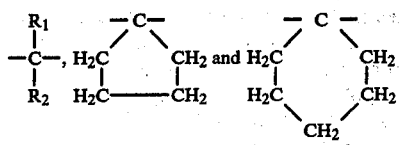

wherein X is a divalent hydrocarbon radical with a total of from 2 up to about 9 carbon atoms selected from the group consisting of:

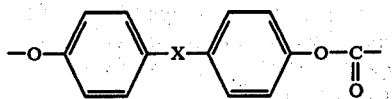

in which $R_1$ represents a member selected from the group consisting of hydrogen and lower alkyl and $R_2$ represents a member selected from the group consisting of phenyl and alkyl of 1 to 7 carbon atoms, in a weight ratio of (a):(b) of about 20:1 to 1:20;

(ii) reacting said blend of step (i) inside said extruder by providing sufficient mixing and heating to homogenously react said polyester (a) and polycarbonate (b), thereby releasing carbon monoxide from said polycarbonate into the reacted polyester/polycarbonate mass;

(iii) passing said reacted polyester/polycarbonate mass of step (ii) through the die section of said extruder, said die section being adapted to cast said polyester/polycarbonate mass therefrom in the form of a sheet, thereby causing said released carbon dioxide to expand in said mass and reduce the density of the extruded sheet, the temperature of the extruded sheet being sufficient to cause rapid crystallization of said sheet;

(iv) passing the foamed, extruded sheet of step (iii) through one or more chill rolls, to reduce the temperature of said sheet, thereby preventing substantial crystallization of said sheet, whereby said sheet can be thermoformed, pursuant to steps (v–vii) recited hereinafter, without substantial shrinkage; the temperature of the thusly cooled sheet being substantially insufficient to cause crystallization of said sheet;

(v) heating said sheet of step (iv), said sheet not being in contact with a mold, said sheet not being subjected to forces comprising a differential in applied pressure to said sheet, said sheet being heated to a temperature sufficient to cause slow crystallization of said sheet, thereby forming a preheated sheet;

(vi) contacting said preheated sheet of step (v) with a mold by applying forces comprising a differential in applied pressure to said sheet so as to make said sheet conform to said mold, said mold being maintained at a temperature higher than that of said preheated sheet sufficient to further heat said sheet to a temperature suficient to rapidly crystallize said sheet;

(vii) allowing said sheet of step (vi) to remain in contact with said mold for a time sufficient to provide sufficient crystallization of said sheet so as to enable the molded sheet to essentially retain its shape without substantial deformation when the, thusly, thermoformed sheet is subsequently cooled to room temperature and is then heated to 400° F. and is maintained at 400° F. for one hour; and (viii) removing said thermoformed sheet of step (vii) from said mold.

BRIEF DESCRIPTION OF THE DRAWING

FIG. 1 is a graph showing various physical properties of annealed blends of polyethylene terephthalate and polycarbonate.

FIG. 2 is a schematic diagram showing a profile for a typical extruder which may be used in the preparation of thermoformed, foamed crystalline sheets in accordance with an aspect of the present invention.

DETAILED DESCRIPTION

For the purposes of the present specification on the claims which follow, the term, polyester/polycarbonate shall expressly connote combinations of:

(a) a high molecular weight linear polyester, which is a polycondensation product of an aromatic dicarboxylic acid and a glycol; and
(b) a high molecular weight linear aromatic polycarbonate represented by the repeating structural unit of the formula:

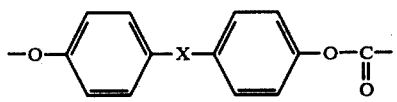

wherein X is a divalent hydrocarbon radical with a total of from 2 up to about 9 carbon atoms selected from the group consisting of:

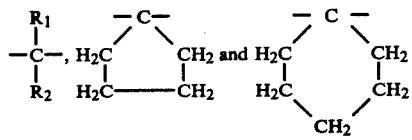

in which $R_1$ represents a member selected from the group consisting of hydrogen and lower alkyl and $R_2$ represents a member selected from the group consisting of phenyl and alkyl of 1 to 7 carbon atoms, wherein said combinations include (i) physical blends of (a) and (b), (ii) reaction products of (a) and (b) including carbon dioxide released by such reaction and (iii) mixtures of said physical blends (i) and reaction products (ii).

According to an aspect of the present invention, it is possible to thermoform plastic objects of substantially reduced density. This density reduction may be at least 5% or even at least 30% with respect to the thermoformed sheet in a non-foamed state. This density reduction permits the formation of light weight objects and reduces the quantity of plastic necessary to form such objects which may result in considerable cost savings.

The degree of foaming of the sheet may also affect the rate of crystallization, particularly in the portions sheet furthermost from the mold surface, due to the thermal insulation properties of foams.

The degree of crystallinity of the foamed polyester/polycarbonate according to the present invention may be sufficient to permit the polyester/polycarbonate, and particularly objects formed therefrom, from resisting thermally induced deformation up to temperatures of at least 400° F. (i.e. about 205° C.) or even at least 500° F. (i.e. about 260° C.). Food containers formed from this crystalline, foamed polyester/polycarbonate may, therefore, be ovenable, i.e. capable of being placed in an oven (e.g., gas, electric or microwave) for a time and temperature sufficient to cook food contained therein. In addition to being ovenable, these food containers may be capable of holding food in freezers. Thus, food containers according to the present invention are capable of remaining dimensionally stable over a wide range of temperatures.

The foamed, crystalline polyester/polycarbonates suitable for use in the present invention may be thermoformed according to a technique corresponding to that employed in the aforementioned Siggel et al U.S. Pat. No. 3,470,114 for making thermoformed objects composed essentially of non-foamed polyesters.

It is possible to produce a foam polyester/polycarbonate simply by reacting a homogeneous mixture of (A) a high molecular weight linear polyester which is a polycondensation product of an aromatic dicarboxylic acid and a glycol and (B) a high molecular weight linear aromatic polycarbonate, in a weight ratio of said polyester (A) to said polycarbonate (B) of about 20:1 to 1:20 (e.g., 20:1 to 1:1), at an elevated temperature and for a period of time sufficient to form the mixture into a softened foamable mass and to release or liberate carbon dioxide from said polycarbonate for foaming said mass. The foamable composition itself can be readily produced by simply homogeneously admixing the two compositions (A) and (B) at a temperature above the softening point of at least one of these components, but at a sufficiently low temperature and/or a sufficiently short period of time and/or under rapid cooling of the homogenized mixture to prevent any substantial splitting-off of carbon dioxide by decomposition of the polycarbonate.

The term "softening point" is employed herein in preference to the designation of a "melting point" since linear polyesters generally do not exhibit a sharp melting point but rather a transition range of temperature at which the polyester softens and finally flows into a melt. Of course, it will be understood that there must be a sufficient degree of flow at or above the softening point to permit deformation and bubble or cell formation within the polyester/polycarbonate mass during actual foaming. The term "high molecular weight" is used herein in the manner generally accepted for the description of synthetic polymers and especially linear polyesters which are to have a substantially solid or rigid structure at normal or room temperatures rather than a liquid or viscous substance as exhibited by relatively low molecular weight polymers. Thus, for most practical uses, linear polyesters should have a molecular weight of at least 10,000 and preferably more than about 20,000.

As the polyester component (A), it is particularly desirable to use polyethylene terephthalate, because it is a readily available bulk product having widespread use as a synthetic fiber in the textile industry. However, there are many known modifications of this linear fiber-forming polyester beginning with the Whinfield et al patent, U.S. Pat. No. 2,465,319, and extending until more recently in which the terephthalic acid can be replaced in part by other aromatic polycarboxylic acids or even a cycloaliphatic dicarboxylic acid such as 1,4-dihydroxy-cyclohexane and in which the glycols are generally designated by the formula

where n is an integer of from 2 to 10. Accordingly, such modified linear polyesters are not to be excluded from the scope of the present invention, even though it is much preferred to use polyethylene terephthalate or those modifications thereof containing not more than 15% and preferably less than 5% by weight of other acid or glycol modifiers.

The polyester component (A) as referred to herein may be a polyalkylene terephthalate (PAT) resin. A polyalkylene terephthalate (PAT) resin is defined throughout the specification and claims to consist of film forming polyesters comprising terephthalic acid moieties and one or more aliphatic diol moieties. The term "moiety" is used to indicate that portion of either the terephthalic acid or the diol which is incorporated into the polyester resin. Examples of diols which can be used are 1,2-ethanediol, 1,4-butanediol, and 1,4-cyclohexanedimethanol. Based upon total moles of terephthalic acid moieties, there can be added up to about 10 mole percent and preferably less than 5 mole percent of one or more aromatic dicarboxylic acid moieties selected from the group of aromatic dicarboxylic acids consisting of isophthalic acid, orthophthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenylaminodicarboxylic acid, 4,4'-diphenylmethyldicarboxylic acid, 4,4'-oxydiphenyldicarboxylic acid, and 4,4'-[1,2-diphenylethane]dicarboxylic acid.

Inherent viscosity (i.v.) of a PAT resin is used throughout the specification and claims to mean that viscosity in dl/g determined at 86° F.±0.09° F. for 0.1 g±0.003 g of said PAT resin in 25 mls of solution. The solvent of said solution is a mixture in percent by weight of 60% phenol and 40% tetrachloroethane. The numerical calculation used to interpret the data is the Billmeyer Equation. The experimental procedure followed is very similar to ASTM D 1243.

According to the above-mentioned method of determination, the polyester component (A) suitable for use in the process of the present invention, may be, e.q., a polyethylene terephthalate resin having an inherent viscosity in the range of about 0.6 to about 12, especially from about 0.8 to about 1.04.

It is to be noted that a particular PAT which has either 0.40 or 0.75 i.v. when measured in a 60% phenol:40% tetrachloroethane solvent at 77° F. has respectively either 1.4 or 2.0 inherent viscosity when measured in a 1% solution in meta-cresol at 77° F.

The aromatic polycarbonates employed as component (B) are a well-recognized class of polymers, referred to as "aromatic polyesters of carbonic acid" by H. Schnell in his article in Angewandte Chemie, vol. 68, No. 20, pp. 633–660, Oct. 21, 1956, and subsequently designated more simply by the term "aromatic polycarbonates" in the book by the same author entitled "Chemistry and Physics of Polycarbonates," Interscience Publishers, New York (1964). This book is incorporated herein by reference in order to avoid undue repetition as to the manner in which the aromatic polycarbonates are prepared, their physical and chemical properties and other detailed information concerning these polymers and their precursors. Since these aromatic polycarbonates are also linear polyesters and are being developed to some extent as stretched and crystallized fibers as well as films, it will be recognized that the polyester/polycarbonate compositions according to the present invention are essentially linear fiber-forming synthetic polyesters of organic dicarboxylic acids and organic dihydroxy compounds, even though each component is quite different in its chemical structure and its normal or most practical utility.

For purposes of the present invention, it is especially desirable to employ the aromatic polycarbonates which can be designated as the linear condensation products of carbonic acid with a 4,4'-dihydroxy-diphenyl-alkane, a 4,4'-dihydroxy-triphenyl-alkane or a 4,4'-dihydroxy-diphenyl-cycloalkane in which the bridging group between the hydroxy-substituted phenyl nuclei contains at least 2 up to about 9 carbon atoms which is free of aliphatic unsaturation. More particularly, the preferred aromatic polycarbonates are those linear polymers defined by the repeating or recurring structural unit of the formula

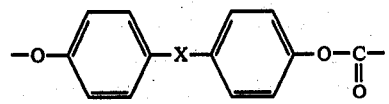

wherein X is a divalent hydrocarbon radical with a total of 2 up to about 9 carbon atoms selected from the group consisting of

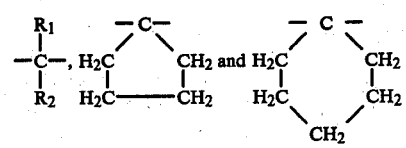

in which $R_1$ represents a member selected from the group consisting of hydrogen and lower alkyl, such as methyl, ethyl or propyl, and $R_2$ represents a member selected from the group consisting of phenyl and alkyl of 1 to 7 carbon atoms. These aromatic polycarbonates can be obtained with molecular weights from about 18,000 up to 500,000 or more, but for purposes of the present invention, it is desirable to use those polycarbonates with a range of the average molecular weight falling between about 20,000 and 250,000 and preferably between about 25,000 and 150,000.

For reasons of economy and availability, it is particularly useful to practice the present invention with the aromatic polycarbonate obtained from 4,4'-dihydroxy-diphenyl-2,2-propane, more commonly referred to as "bisphenol A" and illustrated by the following formula:

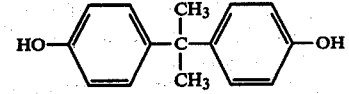

However, good results may also be achieved with the polycarbonate derived from 4,4'-dihydroxy-diphenyl-methyl-phenyl-methane having the formula:

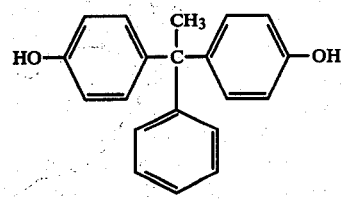

Other suitable aromatic polycarbonates for the purposes of this invention include those derived as the carbonic acid esters of the following dihydroxy aromatic compounds:
4,4'-dihydroxy-diphenyl-1,1-ethane,
4,4'-dihydroxy-diphenyl-1,1-butane,
4,4'-dihydroxy-diphenyl-1,1-isobutane,
4,4'-dihydroxy-diphenyl-1,1-cyclopentane,
4,4'-dihydroxy-diphenyl-1,1-cyclohexane,
4,4'-dihydroxy-diphenyl-phenyl-methane,
4,4'-dihydroxy-diphenyl-2,2-butane,
4,4'-dihydroxy-diphenyl-2,2-pentane,
4,4'-dihydroxy-diphenyl-2,2-hexane,
4,4'-dihydroxy-diphenyl-2,2-isohexane, 4,4'-dihydroxy-diphenyl-2,2-heptane,
4,4'-dihydroxy-diphenyl-2,2-octane,
4,4'-dihydroxy-diphenyl-2,2-nonane,
4,4'-dihydroxy-diphenyl-ethyl-phenyl-methane,
4,4'-dihydroxy-diphenyl-3,3-pentane, and
4,4'-dihydroxy-diphenyl-4,4-heptane.

The polycarbonates of these compounds, i.e., the carbonic acid polyesters prepared therefrom, can be named by attaching the prefix "poly-" and the suffix "-carbonate" to the name of the particular aromatic compound.

Although the description and working examples in this specification are directed primarily to the use of the polycarbonate of 4,4'-dihydroxy-diphenyl-2,2-propane (bisphenol A) in combination with polyethylene terephthalate as the polyester component, there is no intention to limit the invention to these two specific materials which happen to be most practical from a commercial viewpoint. All of the aromatic polycarbonates are closely related in terms of molecular structure and chemical properties with only a few exceptions, even when the phenyl nuclei are further substituted by lower alkyl, halogen, methoxy and the like or when copolymers are formed from different aromatic dihydroxy compounds. In general, it is desirable to employ those polycarbonates having a softening range below about 260° C. and preferably below 250° C.

The aromatic polycarbonates and especially those listed hereinabove such as 4,4'-dihydroxy-diphenyl-2,2-propane are capable of decomposing and releasing carbon dioxide in the presence of the polyester component (A) when heated to temperatures of approximately 250° C. up to 350° C. even though these same polycarbonates alone are quite stable at these temperatures and are often processed on extrusion, casting or molding equipment without any decomposition. Thus, the aromatic polycarbonates when admixed uniformly with other linear polyesters of the polyethylene terephthalate type are capable of acting as an autogeneous foaming agent, even though the homopolymers of these carbonates require the addition of a distinct foaming agent or at least a recognizably unstable gas-liberating compound before any foaming takes place.

The chemical reaction which takes place between the polyester (A) and the polycarbonate (B) in order to release carbon dioxide as the cell-forming gas is believed to be an ester interchange which takes place more rapidly or completely with increasing temperatures and increased residence or retention time in a heating zone. Not only is carbon dioxide liberated in this reaction, but also it appears that the decomposed polycarbonate chains become installed in the macromolecule, i.e. in the linear chain, of the polyester component (A). The possibility of producing such foam polyester/polycarbonates is therefore based upon the concept that aromatic polycarbonates, which otherwise can be normally processed in a temperature range of between 240° C. and 350° C. without decomposition so as to form various shaped or molded articles, undergo a decomposition reaction in admixture with linear polyesters such as those obtained from glycol terephthalates with evolution of carbon dioxide and simultaneous addition of the polycarbonate residue into the linear polyester chain.

The process of foaming the homogeneous mixture of polyester (A) and the polycarbonate (B), as will be apparent, can be carried out in the usual manner for thermoplastic materials containing a foaming agent which is activated at a temperature above the softening point of the material to be expanded. In general, the reaction for releasing carbon dioxide from the polycarbonate and simultaneous foaming can be carried out at temperatures above about 250° C. and preferably from about 270° C. to 350° C. in an at least partially enclosed mold, extruder or similar reaction zone. The retention time in the reaction zone can be relatively short, e.g., from about one minute up to about 15 minutes, preferably from about 1.3 to 1.5 minutes at the higher temperature and about 10 to 12 minutes at the lowest temperature. Temperatures above 350° C. should ordinarily be avoided to prevent unnecessary damage to the linear polyester.

It is possible, especially with the preferred polyester and polycarbonate components, to produce the initial homogeneous mixture under elevated temperatures below about 270° C. and preferably less than 260° C. without causing any perceptible foaming to take place, particularly if this mixing step is carried out rapidly as in a screw extruder or similar mixing or kneading equipment, preferably with rapid cooling of the extruded mixture, e.g. in a cold water bath. For example, when homogenizing in an extruder under these milder conditions, a polycarbonate uniformly dispersed in the polyester can be extruded as rods or sheets, the cooled mixture chopped or granulated and then stored for any period of time without any danger of losing its ability to foam.

As already noted above, the weight ratio of the polyester (A) to the polycarbonate (B) can be varied within a wide range of approximately 20:1 to 1:20, since both components are soluble in one another in any mixing ratio. This offers a further advantage in that the preliminary homogenization step prior to actual foaming, as discussed above, can be accomplished at the lowest possible temperature corresponding to the lower softening range of one of the two components, since one of these components upon melting becomes a solvent for the other component. This in turn permits a much wider choice of suitable polyesters and polycarbonates in terms of monomeric components and molecular weights and a corresponding variation of the final foam polyester product in terms of its physical properties as well as the pore size of its cells.

From an economical viewpoint, a weight ratio of (A):(B) in the upper end of the range of about 20:1 may be preferred. Nevertheless, one advantage of reducing this weight ratio is that the operating temperature may usually be lowered because of a lowering of the softening range of the homogeneous mixture and/or a lowering of the temperature at which substantial amounts of carbon dioxide are released. Likewise, the density of the foamed product will tend to vary inversely with the proportion of the aromatic polycarbonate, as the ratio of A:B decreases from 20:1 to 1:1, although this density can also be controlled by the extent to which the released gas is permitted to expand under a pressure differential.

One of the preferred methods of carrying out a process of the invention consists in the use of a screw injection molding machine, since an ideal homogenization or plasticizing of the polyester-polycarbonate mixture can be achieved in the screw or worm and the production of the foam polyester as a thermoformed article can be carried out in a single continuous operation. More particularly, the polyester-polycarbonate mixture may be homogenized and reacted for release of carbon dioxide under superatmospheric pressure in the screw or worm extruder and may then be extruded or drawn off therefrom at atmospheric pressure so that the softened extruded mass rapidly foams and resolidifies into the desired extruded shape. Thus, foam polyester can be produced as sheets by using a suitable die opening on the extruder.

Conventional components of extrusion apparatus can be used in these processes, and these are heated in the usual manner so as to maintain the desired homogenizing and foaming temperature of up to about 350° C., preferably above about 270° C., for the foaming reaction.

A sufficient degree of crystallinity may be imparted to the foamed polyester/polycarbonate by sufficient annealing or tempering subsequent to the foaming process. A preferred process is annealing a preformed, foamed polyester/polycarbonate sheet material in a thermoforming process as described in the Dempsey et al U.S. Pat. No. 4,127,631.

When foamable polyester/polycarbonate is extruded into a sheet material, foaming generally takes place the instant thhe softened polyester is subjected to sufficient foaming pressure (e.g., upon being exposed to atmospheric pressure upon leaving the extrusion die). The foamed sheet may then be immediately cooled on a chill roll, e.g., at a temperature of from about 70° F. (i.e. about 21° C.) to about 120° F. (i.e. about 49° C.), in order to inhibit crystallization. A sheet of predominantly amorphous foamed polyester/polycarbonate can then be thermoformed by means of a differential in applied pressure of less than about 5 atmospheres in a mold at a temperature in the range of 240°-380° F. into a finished article having a crystallinity of at least 16%, which finished article will not with subsequent use become very brittle, and which can be used without melting or distorting when subjected to heating to a temperature of about 400° F. for an hour or more.

Time dependent processes occurring during a conventional thermoforming step which lead to a loss of dimensional integrity of a sheet of foamed polyester/polycarbonate can be balanced by other time dependent processes leading to a stabilization of dimensional integrity so that a predominantly amorphous sheet of foamed polyester/polycarbonate can be thermoformed directly into a thermoformed article of crystalline foamed polyester/polycarbonate on process equipment conventionally used with thermoplastic materials such as polystyrene, polyethylene, amorphous polyethylene terephthalate, and the like.

The time dependent processes leading to a loss of dimensional integrity in a thermoforming step involve time dependent forces used to conform a foamed polyester/polycarbonate sheet to a mold surface and the rate of heat transfer from said heated mold surface to essentially the entire thickness of said polyester/polycarbonate sheet.

Time dependent processes leading to a stabilization of dimensional integrity of said polyester/polycarbonate sheet in a thermoforming process step is the process of crystallization which is dependent upon an initial rate of crystallization of said polyester/polycarbonate sheet increased by the heat transferred from a heated mold. It has been found that this initial rate and subsequent rate change in crystallization of a sheet is controlled by at least five factors: (1) the half-time for crystallization at some temperature of the sheet, (2) the film thickness of the sheet, (3) the thermally induced average crystallinity of the sheet just prior to contact with a heated mold, (4) the average initial temperature of the sheet just prior to contact with said mold, and (5) the temperature of said mold. The degree of foaming of the sheet may also affect the rate of crystallization, particularly in the portions sheet furthermost from the mold surface, due to the thermal insulation properties of foams. It is to be noted that average crystallinity and the half-time for crystallization of the sheet are coupled variables.

Foamed polyester/polycarbonate sheets having a half-time for crystallization at 410° F. much below 0.5 minute are very difficult to handle. This is because the lower the half-time for crystallization, the generally lower must be the average crystallinity of the sheet just prior to contact with the heated mold. To thermoform a material with a half-time for crystallization much below 0.5 minute having both a low thermally induced average crystallinity and an average temperature in the range of about 210°-300° F. is generally very difficult, because the rate of heating of a totally amorphous polyester/polycarbonate sheet must be very rapid to permit one to form such a sheet at all, and even if formed, the length of time such a sheet can exist as a usefully thermoformable sheet can be very short, i.e., on the order of less than about a tenth of a second.

Sheets having a half-time for crystallization at 410° F. of much more than 5 minutes become commercially impractical for the disclosed thermoforming process. This is because the length of time necessary is on the order of minutes for such sheets (i) to reach a thermally induced average crystallinity in the range of about 0% to 18% at a temperature in the range of about 210°-300° F. and subsequently, (i) to be shaped in contact with a mold at 240°-380° F. and allowed to remain in such contact until a 20% average crystallinity is achieved. A commercially attractive thermoforming process requires (i) and (ii) both to be achieved on the order of about 30 seconds.

In general, the lower is the half-time for crystallization at 410° F. of a polyester/polycarbonate sheet, the faster is the initial rate of crystallization at all temperatures for an amorphous sheet or web of said polyester/polycarbonate. Rapidly heating, as for example by means of an infrared heating source, generally produces a thermal gradient. The thicker a particular sheet or web is, the greater generally are the maximum differences in temperature therein.

The thickness of a particular polyester/polycarbonate sheet is primarily limited by the particular method of heating insofar as such heating process significant variations in temperature throughout a sheet. It is to be noted that such variations in temperature induce variations in crystallinity throughout the sheet. Thus if a polyester/polycarbonate sheet is too thick for a particular method of heating, then before the interior areas of said sheet have reached that thermoforming temperature in the range of about 210°-300° F., the crystallization at or near the surface has proceeded to such an extent that the sheet is no longer thermoformable at low pressure.

The thermoforming temperature range is primarily determined at the lower end, by the fact that at lower and lower temperatures a polyester/polycarbonate sheet becomes more and more stiff and eventually loses that minimal amount of flexibility necessary for proper thermoforming; and at the upper end, by the fact that at higher and higher temperatures said polyester/polycarbonate sheet becomes more and more flexible and eventually loses that minimal amount of dimensional integrity necessary for proper thermoforming. The precise point when the high and low limits are reached for a particular polyester/polycarbonate sheet or web depends in part on the average crystallinity throughout that sheet or web.

Other things being equal, as the sheet temperature increases from 270° F. to 300° F., it becomes more difficult to handle the sheet because of an increased rate of crystallization, and as sheet temperature decreases from 225° F. to 210° F. the sheet becomes more stiff and ultimately loses that minimal amount of flexibility necessary for proper low pressure thermoforming. Likewise as the mold temperature increases from 380° F. to 450° F., the sheet acts progressively more amorphous with respect to contact with the mold. As the mold temperature decreases from 270° F. to 240° F., the rate of crystallization decreases and the process becomes unduly long. Accordingly, it is preferred to contact a polyester/polycarbonate sheet at a temperature in the range of 225° F. to 270° F. with a mold at a temperature in the range of 300°–350° F.

The following discloses the specific conditions necessary to carry out a process of this invention in view of the time dependent processes going on.

Generally a process of this invention comprises thermoforming a foamed polyester/polycarbonate sheet or web which has a half-time for crystallization at 410° F. below about 5 minutes, and preferably below about 3 minutes and of at least about a half a minute, and which has an average temperature in the range of about 210°–300° F. and preferably about 225°–270° F., and a thermally induced average crystallinity in the range of about 0% to 18% and preferably about 5% to 15%, by:
  (a) contacting said sheet with a mold which is at a temperature in the range of about 240°–380° F. and preferably in the range of about 300°–350° F. wherein said mold is preferably at a higher temperature than said sheet prior to contact therebetween;
  (b) applying forces comprising a differential in applied pressure to said sheet so as to make a thermoformed sheet which conforms to said mold;
  (c) allowing said thermoformed sheet to remain in contact with said mold until an average crystallinity of at least 16% is achieved;
  (d) removing said thermoformed sheet from said mold; and
  (e) allowing said thermoformed sheet to cool.

During the shaping step of a thermoforming process the use of a heating mold which is preferably at a higher temperature than said sheet prior to contact therebetween. Further, limitations as to rate of crystallization as indicated by the half-time for crystallization at some reference temperature, and a temperature range for the heated mold are important. Two results from using a heated mold versus an unheated mold are: (1) that there is no problem during heat annealing from either shrinkage or inhibition of crystallization because of any shear induced orientation which can be introduced during the shaping of a sheet to a mold and (2) superior wall thickness uniformity is in general achieved. The greater the draw ratio which in turn generally involves greater shear stresses and more orientation that is generally induced which in turn inhibits thermally induced crystallinity and also which generally increases shrinkage.

The half-time for crystallization of a material is defined throughout this specification and claims with reference to the classical Avrami equation $$-\ln X = Kr^n$$

where x is the fraction of uncrystallized material and is equal to [1−(change in volume at time, t)/(change in volume at time, t=infinity)]
and where K and n are empirical coefficients found with respect to said material,
to mean that time, $t_{\frac{1}{2}}$, found in the above equation when x=0.5.

A known technique for measuring a half-time is given by J. H. Magill in Polymer V.2, page 221 (1961) in an article entitled "Depolarized Light Intensity Technique."

A differential in applied pressure is defined throughout the specification and claims to mean the difference in pressure between that lesser pressure on the side of the sheet to be thermoformed which is nearer to the mold surface and that greater pressure on the side of the sheet opposite thereto.

It is to be noted that the extrudate may be brought into contact with a chill roll so that no orientation or substantially no orientation is induced in the final sheet and there is a thermally induced average crystallinity in the finished sheet of less than about 10% and preferably less than about 5%. The amount of average crystallinity in the extruded sheet will depend upon how rapidly the extruded sheet is cooled, which in part depends upon the thickness of said sheet. If there is too much orientation in the sheet, heating before and during thermoforming will tend to induce substantial undesirable shrinkage. Such shrinkage can interfere with the thermoforming process.

In another embodiment of this invention, the process for thermoforming a foamed polyester/polycarbonate sheet comprises:
  (1) forming said sheet so that it is substantially unoriented, has a thermally induced average crystallinity in the range of about 0–10%, and has a half-time for crystallization at 410° F. below about 5 minutes and preferably below about 3 minutes and above about 0.5 minutes,
  (2) heating said sheet to an average temperature in the range of about 210°–300° F. and preferably in the range of about 225°–270° F. at such a rate (generally for example on the order of 10°–25° F./sec.) that by the time that said sheet has reached said temperature said sheet has an average crystallinity in the range of about 0% to 18%, and preferably about 5% to 15%.
  (3) thermoforming said sheet by:
    (a) contacting said sheet with a mold which is at a temperature in the range of about 240°–380° F. and preferably in the range of about 300°–350° F. wherein said mold is preferably at a higher temperature than said sheet prior to contact therebetween;
    (b) applying forces comprising a differential in applied pressure to said sheet so as to make a thermoformed sheet which conforms to said mold;
  (4) allowing said thermoformed sheet to remain in contact with said mold until an average crystallinity of at least 16% is achieved;
  (5) removing said thermoformed sheet from said mold;
  (6) allowing said thermoformed sheet to cool; and
  (7) trimming said thermoformed sheet.

It is to be noted that the step of trimming can precede the step of removing said thermoformed sheet from said mold, or of allowing the thermoformed sheet to cool to room temperature and the total cycle time requires about 30 seconds.

The maximum differential in applied pressure is determined by the tendency of the polyester/polycarbonate sheet to be drawn into any vacuum passages present in a mold. Generally the greater the differential in applied pressure, the more the thermoformed sheet will conform to the surface of the mold and the better the definition of the finished thermoformed part. It is to be noted however that the polyester/polycarbonate sheets made according to this invention can be thermoformed satisfactorily at a differential in applied pressure below 5 atmospheres and preferably as low as about one atmosphere.

Methods for producing a differential in applied pressure are well known. Use of differentials in fluid pressure, such as with air, or a combination of reduced fluid or air pressure on one side with a solid cooperating surface on the other side are two known examples.

Any crystallization initiator can be used which in concentrations of up to about 1 part by weight to 100 parts by weight of polyester/polycarbonate which forms a homogeneous blend with said polyester/polycarbonate resin wherein these results a composition having a half-time for crystallization at 410° F. below about 5 minutes and preferably below about 3 minutes and above about 0.5 minutes. As is well known, the more surface to volume of a particular initiator, the more effective it is as an initiator of crystallization. Examples of such initiators are $TiO_2$, talc, MgO, $BaSO_4$, $SiO_2$, $Al_2O_3$, CdO, ZnO, mica fuller's earth, diatomaceous earth, and asbestos or the like. In general, initiators perform satisfactorily which have a median particle size in the range of about 1 to 5 microns wherein 95% of the particles have a size which is below about 10 microns and substantially all of the particles have a size which is below about 100 microns and which are present, in the composition of 100 parts by weight of polyester/polycarbonate, in the range of 0.1–1 part, and preferably of about 0.2–0.6 part. Median particle size is defined throughout the specification and claims to mean a particle size in a distribution of particles wherein 50% of the particles are larger than said particle size. It is to be noted that too high a concentration by weight of a crystallization initiator, i.e. much above about 1 part can increase the half-time for crystallization and also can induce an annealed average crystallinity above 60% and that if the initiator particle size is too large undesirable discontinuities appear in the extruded polyester/polycarbonate sheet commonly referred to in the art as "gel particles".

It is to be noted that, during the thermoforming process, as a polyester/polycarbonate sheet is being made to conform to a mold surface it must not become in some areas so oriented that the process of thermally induced crystallization in said areas is substantially inhibited.

In still another embodiment of this invention, a process is provided to permit thermoforming of polyester/polycarbonate sheets to a draw ratio in excess of about 3 without introducing so much orientation that shrinkage and crystallization inhibition become problems.

In general, the process for deep-draw thermoforming a sheet of foamed polyester/polycarbonate which is substantially unoriented, has a half-time for crystallization at 410° F. below about 5 minutes, is at an average temperature in the range of about 210°–300° F., and preferably in the range of about 225°–270° F. and has an initial thermally induced average crystallinity in the range of about 0% to 18%, and preferably in the range of about 5% to 15%, comprises:

(a) contacting said sheet with a deep-draw mold which is at a temperature in the range of about 240°–380° F. and preferably in the range of about 300°–350° F. wherein said mold is preferably at a higher temperature than said sheet prior to contact therebetween;

(b) applying forces comprising a differential in applied pressure to said sheet so as to make said sheet conform to said mold, whereby a thermoformed sheet having a draw ratio in excess of about three can be achieved;

(c) allowing said thermoformed sheet to remain in contact with said mold until an average crystallinity of at least about 16% is achieved; and (d) removing said thermoformed sheet from said mold.

It is to be noted that if the shaped or thermoformed sheet does not have to withstand prolonged heating at 400° F., it can be removed from the mold before 16% thermally induced average crystallinity has been achieved.

A surprising feature of the process of the present invention is the manner in which the crystallinity of the foamed extruded sheet can be controlled throughout the process. More particularly, heat must be readily transferred throughout essentially the entire thickness of the sheet during steps (iv), (v) and (vii) of the process. Since plastic foams are known to be excellent thermal insulators, it could well have been expected that heat would not readily be transferred throughout essentially the entire thickness of the sheet, especially in the cooling step (iv), wherein the initially extruded sheet at a temperature sufficient to cause rapid crystallization is cooled over one or more chill rolls to a temperature wherein crystallization is prevented. A particularly surprising discovery has been that thermoformed, foamed crystalline plastic sheets of essentially any dimension can be prepared at essentially the same maximum rate (i.e. essentially as rapidly) as comparable non-foamed, crystalline plastic sheets of the same dimension. An example of such a comparable non-foamed crystalline plastic sheet would be a non-foamed sheet prepared by the same process used to prepare the comparable foamed sheet, except that the polycarbonate (b) component of the polyester/polycarbonate mixture would be omitted and the die opening of the extruder would be adjusted to extrude a non-foamed polyester sheet of equal thickness to the thickness of the comparable foamed polyester/polycarbonate sheet. In this regard, it is noted that a polyester/polycarbonate containing released carbon dioxide would be expected to expand as it passed through an extrusion die. Therefore, given the same die opening, such a polyester/polycarbonate mass mixture would be expected to yield a thicker sheet than a mass composed entirely of polyester containing no carbon dioxide.

The thickness of the extruded foamed sheet may be, e.g., about 40 mils or less at a time after essentially all of the carbon dioxide has finished expanding, e.g., at a time when the sheet first contacts a chill roll. A particular range of thicknesses for the extruded sheet would be from about 10 to about 40 mils., a preferred thickness being about 20 mils. It is noted that the void volume of the extruded sheet remains essentially constant during the entire thermoforming process. Thus, cells appear to neither collapse or expand during this process inspite of the fact that the sheet is subjected to various thermal and mechanical stresses. The void volume of the extruded sheet may be at least 10%, e.g., from about 10% to about 50%. As will be pointed out in Example II hereinafter, the density reduction associated with this void volume may result in substantial cost savings.

EXAMPLE I

A pellet mixture consisting of polyethylene terephthalate (Goodyear CLEARTUF 1002), 10 parts, and polycarbonate (Mobay Merlon M-39), 1 part, was extruded through a Brabender extruder to produce an amorphous sheet, 0.02 inches their density=0.83 gms/cc. This material was heated to 80° C. and stretched 25 and 112%, cooled; upon reheating this original form was regained (shrink wrapping application). The material was also heated to 350° F., it was effectively heat-set and retained its shape upon subsequent heating to 350°-400° F. (Ovenable container application).

Extrusion consisted of a Brabender temperature profile of 265°, 315°, 335°, 275° C., resulting in a melt temperature at the die of 265°-285° C.; the molten material from the extruder die was immediately cooled on a chill roll (70°-120° F.) to prevent crystallization.

The foregoing Example demonstrates that foamed polyethylene terephthalate can be heated and shaped while maintaining its density and cells. By heat setting the foam (350° F. for 0.2-5 minutes) a product is produced which retains its shape upon subsequent reheating, and retains its flexibility and most of its toughness, the foam not collapsing during any heating nor the foam wrapping.

EXAMPLE II

The resins used in this Example were Goodyear's Cleartuf 1002 polyethylene terephthalate (PET) resin characterized by its high molecular weight (1.04 I.V.) and Mobay's Merlon M-39F clear tint polycarbonate (PC). The PET and PC resin pellets were dry-blended, as required, and dried in a nitrogen flushed oven at 100° C. under vacuum (less than 3" of mercury) for 24 hours. The resin compositions were removed from the oven, placed under a nitrogen blanket, and transferred to the nitrogen flushed hopper of a Brabender extruder. The time between removal from the oven and completion of extrusion was less than 15 minutes in all cases.

The resin compositions were extruded through a 2" wide and 20 mil thick sheet die onto a chilled (about 100°-120° F.) take-off roll. In general, processing parameters were those especially suited for processing PET, except that lower die temperatures were used to increase backpressure. An extruder temperature profile of 280°, 315°, 335°, and 275° C. was used with a screw speed of 40 rpm. These conditions produced resin melt temperatures of 280°±5° C. A slight yellowing was observed at the center of some of the extruded samples and possibly was caused by residue materials in the extruder which were excessively heated between runs.

Thermal analysis by DSC was conducted on the quenched samples and on samples annealed at 350° F. for 10 minutes. The annealed samples were also analyzed for thermomechanical properties on a torsional braid analyzer (TBA), where a thermal cycle of room temperature to 200° C. to −180° C. to 250° C. was used. Tensile testing of the samples was not performed due to sample non-uniformity and limited width. However, all of the samples were qualitatively tough and did not appear to have been hydrolyzed by water, as compared to a non-dried PET sample extruded for comparison.

Extrusion of the PET/PC blends produced foamed sheet, apparently caused by a release of carbon dioxide formed by the reaction of PET and PC at elevated temperatures. Greater density reductions occurred when a given weight of PC was added to PET, as compared to the addition of PET to PC. In the range of blend ratios tested (0-30 weight percent), a maximum density reduction of about 50% was achieved for the 85/15 and 30/70 PET/PC blends (Table I). Overblowing or equipment limitations apparently altered the density reduction achieved with the 70/30 PET/PC blend.

Assuming a raw material cost (RMC) of 4 cents/in$^3$ and 6.6 cents/in$^3$ for materials composed entirely of PET and PC, respectively, the foaming phenomenon of this Example produced lower density materials whose volume cost was a minimum of 2.4 cents/in$^3$ for the 85/15 PET/PC blend (Table 1).

TABLE 1

| Physical and RMC Cost Data of PET/PC Blends | | | | | | |
|---|---|---|---|---|---|---|
| PET wt. % | PC wt. % | Density | | | RMC Cost | |
| | | Calc.$^a$ | Found | % Reduction | $/lb. | c/in$^3$ |
| 100 | 0 | 1.38 | 1.38 | 0 | 0.81 | 4.0 |
| 92.5 | 7.5 | 1.37 | 1.15 | 16 | 0.85 | 3.6 |
| 85 | 15 | 1.35 | 0.71 | 47 | 0.92 | 2.4 |
| 70 | 30 | 1.33 | 0.97 | 27 | 1.03 | 3.6 |
| 30 | 70 | 1.25 | 0.65 | 48 | 1.31 | 3.1 |
| 20 | 80 | 1.24 | 1.0 | 19 | 1.39 | 5.0 |
| 10 | 90 | 1.22 | 1.15 | 7 | 1.46 | 6.0 |
| 0 | 100 | 1.20 | 1.20 | 0 | 1.53 | 6.6 |

$^a$Calculated by additivity

In spite of the variations of density with composition, the blending of PET and PC resulted in materials whose thermal and thermomechanical properties generally varied in an additive fashion with composition (Tables 2, 3 and FIG. 1). This trend was observed in the melting point, glass transition, low temperature secondary transition, heat of fusion and crystallization, percent crystallinity, and modulus as seen in the DSC results (Table 2) and TBA results (Table 3). The only anomoly to the trend was observed in the room temperature modulus of the 30% PC/PET sample by TBA (Table 3). This may be a result of a skin/foam/skin structure associated with the apparent limited density reduction (Table 1) observed for this sample.

TABLE 2

| Thermal Analysis of PET/PC Blends by DSC | | | | | | | | | |
|---|---|---|---|---|---|---|---|---|---|
| PET Wt. % | PC Wt. % | Sample Type | Tg °C. | Cold Crystallization | | Melt | | Crystallinity X$_c$ | |
| | | | | Tcc °C. | −H$_{cc}$ cal/gm | TM °C. | H$_f$ cal/gm | Before DSC % | After DSC % |
| 100 | 0 | Quenched | 69 | 134 | 7.2 | 252 | 10.6 | 11 | 35 |
| | | Annealed | 68 | — | — | 250 | 9.5 | 32 | 32 |
| 92.5 | 7.5 | Quenched | 72 | 158 | 7.9 | 241 | 7.3 | 0 | 24 |

TABLE 2-continued

Thermal Analysis of PET/PC Blends by DSC

| PET Wt. % | PC Wt. % | Sample Type | Tg °C. | Cold Crystallization Tcc °C. | −Hcc cal/gm | Melt TM °C. | Hf cal/gm | Crystallinity Xc Before DSC % | After DSC % |
|---|---|---|---|---|---|---|---|---|---|
|  |  | Annealed | 79 | — | — | 240 | 7.3 | 24 | 24 |
| 85 | 15 | Quenched | 78 | 162 | 4.4 | 234 | 5.5 | 4 | 18 |
|  |  | Annealed | 77 | — | — | 235 | 5.9 | 20 | 20 |
| 70 | 30 | Quenched | 82 | 175 | 2.0 | 228 | 1.7 | 0 | 6 |
|  |  | Annealed | 88 | — | — | 227 | 4.7 | 16 | 16 |

Notes:
Tg — glass transition temperature
Tm — melting peak temperature
Tcc — cold crystallization temperature
−Hcc — heat of cold crystallization
Hf — heat of fusion
Xc — percent crystallinity, based on H = 30 cals/gm for 100% crystalline PET
Heating Rate — 10° C./min.

TABLE 3

Torsional Braid Analysis of PET/PC Blends

| PET wt. % | PC wt. % | Tg$_a$ °C. | Tg$_b$ °C. | T$_{sec}$ °C. | T$_{endc}$ °C. | E'RT$_d$ × 10$^{-10}$ |
|---|---|---|---|---|---|---|
| 100 | 0 | 81 | 98 | −52 | 250 | 1.28 |
| 92.5 | 7.5 | 88 | 100 | −54 | 245 | 1.13 |
| 85 | 15 | 91.5 | 106 | −56 | 233 | 1.07 |
| 70 | 30 | 105 | 122 | −62 | 230 | 1.1 |
| 30 | 70 | 124 | 137 | −76 | 208 | 1.04 |
| 0 | 100 | 146 | 150.5 | −98 | 164 | 0.94 |

NOTES:
$_a$onset of Tg from storage modulus curve
$_b$midpoint of Tg from loss modulus curve
$_c$sample elongated and ended test
$_d$room temperature modulus (E'RT) assumes E' = 2 × 10$^{10}$ at −180° C. for all samples
Heating Rate - 5° C./min at 1 Hz/sec.

The dependence of thermal and thermomechanical properties on blend composition could be interpreted as being the result of a copolymer formation. The observed glass transition temperatures are in general agreement with those calculated for compatible blends or copolymers, although variations in the TBA results at higher PC loadings may indicate that some type of morphological structure is present which has exceptional thermal stability (Table 4). The glass transition temperature (Tg) measured by TBA occurs at a maximum in a loss modulus. It is 30°–40° C. higher than the second order thermal transition Tg measured by DSC. This is evidence that mechanical rigidity is maintained at temperatures above the changes in heat capacity for these materials.

TABLE 4

Actual vs. Calculated Glass Transition Temperatures
Calculated values based on 1/Tg = W$_1$/Tg$_1$ + W$_2$/Tg$_2$
where: Tg$_1$ — PC
Tg$_2$ — PET

| % PC | DSC Transitions, °C. Calc. | Found$^c$ | TBA$^b$ Transitions, °C. Calc. | Found |
|---|---|---|---|---|
| 0 | 69 | 69,68 | 98 | 98 |
| 7.5 | 72 | 72,79 | 101 | 100 |
| 15 | 75 | 78,77 | 103 | 106 |
| 30 | 82 | 82,88 | 109 | 122 |
| 70 | 111 | — | 129 | 137 |
| 100 | 150 | 150$^a$ | 150 | 150 |

$^a$literature value
$^b$based on midpoint of transition
$^c$1st value - quenched sample; 2nd value - annealed sample The temperature range over which the Tg occurred in the TBA testing was progressively decreased as the composition changed from PET to PC. This trend is indicative of greater morphological uniformity in the glassy regions as the level of PC is increased. Decreasing boundary interfaces between crystalline and amorphous regions could produce such morphological uniformity as the PC level is increased. The baseline drift of the samples on the TBA recorder is due to variations in sample dimensions and cell size effects of the foam.

A study of the extrusion blending of PC and an analog of PET, polybutylene terephthalate (PBT) is reported by Devaux, J.; Giodard, P.; and Marcier, J. P.; Polymer Eng. and Sci.; March, 1982; 22(4), 229–233. In this study it was concluded that PC and PBT undergo transesterification reactions for conditions similar to those reported in this Example. Using solubility considerations, model reactions, I.R. evaluations, and dyad and triad analyses by NMR, it was shown that extrusion of PBT and PC resulted in block copolymer formation. Longer reaction times were found to produce statistically random copolymers. The use of phosphite materials was found to inhibit the transesterification reactions. This was presumed to be due to a complexation of the phosphite with the transesterification catalyst, tetra-n-butyl-titanate. The latter was present in the PBT due to its catalytic activity in the manufacture of PBT. The formation of foam was also observed in the PBT/PC blends. It remains to be determined if an antimony based catalyst which may be present in PET resins is catalytically active for the transesterification foaming reactions of PET/PC blends.

EXAMPLE III

This Example demonstrates the use of the extruder temperature profile as a means to control the density of foamable polyethylene terephthalate/polycarbonate (PET/PC) blends.

FIG. 2 illustrates a typical extruder having a screw 20 and a barrel 22. Feed, mixing, compression, meter, adaptor and die zones are set forth as Zones 1, 2, 3, 4, 5 and 6, respectively.

Polyethylene terephthalate (Goodyear VFR 6551x; PET) and polycarbonate (Mobay Merlon M39 natural; PC) were dry blended in the ratio of PET:PC::95:5 by weight. The blend was then dried at 100°–110° C. under vacuum (1–3" gauge pressure) for 16–22 hours.

The blend was extruded through a 1½ inch extruder equipped with a mixing screw (Maddock type), slot die (8" wide, 0.040" gap), and cast film take-off equipment.

By controlling the extruder temperature profile (feed zone to die lips) the density reduction achieved with the foamable PET/PC blend was controlled. Thus, with the following extruder temperature profiles the density reductions achieved were varied from about 0–30% in the resultant cast sheet (Table 5).

TABLE 5

| Run No. | Zone Temperature Setting, °F. | | | | | | Resin Melt Temp., °F. | Density of Product gms/cc | Density Reduction % |
|---|---|---|---|---|---|---|---|---|---|
| | 1 (Feed) | 2 (Mixing) | 3 (Compression) | 4 (Meter) | 5 (Adaptor) | 6 (Die) | | | |
| 2 | 540 | 630 | 630 | 630 | 520 | 500 | 510 | 1.32 | 2 |
| 3 | 540 | 640 | 670 | 650 | 590 | 500 | 570 | 1.17 | 13 |
| 1 | 540 | 610 | 650 | 650 | 570 | 530 | 560 | 1.11 | 18 |
| 4 | 540 | 640 | 690 | 670 | 590 | 500 | 565 | 0.94 | 30 |

The density of a given PET/PC blend can be controlled through modifications of the time and temperature parameters during processing. At constant extrusion speed (70 rpm in Example III) and material throughput, heat history of the material is controlled largely by two factors: primarily, by the transfer of mechanical energy to heat, and secondarily, by heat transfer from the extruder barrel to the polymer. Both processes occur at a maximum rate when the clearance between the extruder screw 20 and barrel 22 are narrowest (J. M. McKelvey, Polymer Processing, John Wiley & Sons, 1962).

In the 1¼" extruder used in the experiment of Example III, the polymer melt channel is narrowest in the compression and metering sections, i.e., Zones 3 and 4, respectively (Refer to FIG. 2). The density of the resultant PET/PC foam product has been found to be largely controlled by the average temperature the polymer encounters in these two zones.

| Run No. | Average Temperature of Zones 3 and 4 °F. | Resultant Product Density gms/cc |
|---|---|---|
| 1 | 650 | 1.11 |
| 2 | 630 | 1.32 |
| 3 | 660 | 1.17 |
| 4 | 680 | 0.94 |

Thus, runs 1 and 3, with similar average temperatures in Zones 3 and 4, resulted in products whose density was approximately equivalent. Increasing the average temperature of Zones 3 and 4 decreases the product density.

The temperature profile for Zones 1–6 may be varied over a range to achieve similar product densities. For example, the temperature in Zones 3 and 4 could be lowered and the temperature of Zones 1, 2, 5, and 6 increased to achieve a comparable thermal history. However, it has been found to be technologically more useful to employ an increasing temperature over Zones 1, 2, and 3, and decreasing temperatures from Zones 4 through 6. Lower temperatures in Zone 1 improve polymer feeding characteristics (down to about 520°–560° F.), while lower die temperatures (Zone 6) improve backpressure, which tends to keep the gas in solution and decrease foam cell sizes. Lower die temperatures also improve the surface appearance of the product.

Changing the extruder speed and material throughput rate with a given temperature profile will alter product density. Whether the product density increases or decreases as a result of changing screw speed depends upon the particular extruder configuration. Higher speeds reduce the polymers residence time in the extruder, but also increases the rate of mechanical heating. Which factor predominates is believed to be a function of the extruder screw design.

The essential feature of controlling the foamed PET/PC product density is the control of the polymer's thermal history in a given extruder. The thermal history is controlled by the residence time and temperature of the melt. Varying these parameters allows product density control.

COMPARATIVE EXAMPLE A

Preliminary tests were conducted to determine the feasibility of foaming PET with chemical blowing agents (CBA). Proprietary organic hydrazo-derivatives from Uniroyal (Celogen HT 500 and HT 550) were added at the 0.3% level to predried PET and extruded. Although density reductions of 20–40% were achieved with the HT 500 CBA, the resultant foams were orange-yellow in color and very brittle. It should be noted that other CBA classes are available which may be more suitable for foaming PET resins and which were not evaluated.

The process of the present invention, whereby a prefoamed, polyester/polycarbonate foam sheet is thermoformed, has the advantage that a portion of this foamed sheet material may be diverted from the thermoforming process to make shrinkable films or tapes for packaging applications.

It is noted that, when foaming foams in accordance with the present invention, polyester/polycarbonate blends should be maintained as dry as possible, e.g., prior to introduction into the extruder, to prevent moisture induced reductions in molecular weight. It is further noted that such polyester/polycarbonate blends may contain fillers, processing aids, nucleators to increase crystallization rate, and other additives known to the art which accomplish various technical effects.

What is claimed is:

1. A process for preparing a thermoformed, foamed, crystalline, plastic sheet, said sheet being essentially composed of the foamed reaction product of a polyester and a polycarbonate, said process comprising the steps of:
   (i) introducing into an extruder a mixture consisting of:
      (a) a high molecular weight linear polyester, which is a polycondensation product of an aromatic dicarboxylic acid and a glycol; and
      (b) a high molecular weight linear aromatic polycarbonate represented by the repeating structural unit of the formula:

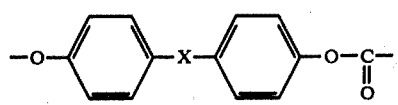

wherein X is a divalent hydrocarbon radical with a total of from 2 up to about 9 carbon atoms selected from the group consisting of

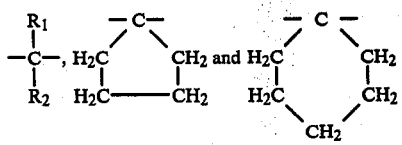

in which $R_1$ represents a member selected from the group consisting of hydrogen and lower alkyl and $R_2$ represents a member selected from the group consisting of phenyl and alkyl of 1 to 7 carbon atoms, in a weight ratio of (a):(b) of about 20:1 to 1:20;

(ii) reacting said blend of step (i) inside said extruder by providing sufficient mixing and heating to homogeneously react said polyester (a) and polycarbonate (b), thereby releasing carbon dioxide from said polycarbonate into the reacted polyester/polycarbonate mass;

(iii) passing said reacted polyester/polycarbonate mass of step (ii) through the die section of said extruder, said die section being adapted to cast said polyester/polycarbonate mass therefrom in the form of a sheet, thereby causing said released carbon dioxide to expand in said mass and reduce the density of the extruded sheet, the temperature of the extruded sheet being sufficient to cause rapid crystallization of said sheet;

(iv) passing the foamed, extruded sheet of step (iii) through one or more chill rolls, to reduce the tempeature of said sheet, thereby preventing substantial crystallization of said sheet, whereby said sheet can be thermoformed, pursuant to steps (v–vii) recited hereinafter, without substantial shrinkage, the temperature of the thusly cooled sheet being substantially insufficient to cause crystallization of said sheet;

(v) heating said sheet of step (iv), said sheet not being in contact with a mold, said sheet not being subjected to forces comprising a differential in applied pressure to said sheet, said sheet being heated to a temperature sufficient to cause slow crystallization of said sheet, thereby forming a preheated sheet;

(vi) contacting said preheated sheet of step (v) with a mold by applying forces comprising a differential in applied pressure to said sheet so as to make said sheet conform to said mold, said mold being maintained at a temperature higher than that of said preheated sheet sufficient to further heat said sheet to a temperature sufficient to rapidly crystallize said sheet;

(vii) allowing said sheet of step (vi) to remain in contact with said mold for a time sufficient to provide sufficient crystallization of said sheet so as to enable the molded sheet to essentially retain its shape without substantial deformation when the, thusly, thermoformed sheet is subsequently cooled to room temperature and is then heated to 400° F. and is maintained at 400° F. for one hour; and (viii) removing said thermoformed sheet of step (vii) from said mold.

2. A process according to claim 1, wherein said sheet of step (iv) has a void volume of at least about 10% and a thickness of 40 mils or less.

3. A process according to claim 2, which is capable of producing said thermoformed, foamed crystalline plastic sheet at essentially the same maximum rate as a comparable thermoformed, non-foamed crystalline plastic sheet, said non-foamed sheet being prepared by the same process as used to produce said foamed sheet, except that the polycarbonate (b) component of the polyester/polycarbonate mixture for said foamed sheet is omitted and the die opening of said extruder is adjusted to extrude a non-foamed polyester sheet of equal thickness to the thickness of the extruded foamed polyester/polycarbonate sheet.

4. A process according to claim 1, wherein the void volume of the extruded sheet of step (iii) remains essentially constant as said sheet is subjected to said steps (iv) to (viii).

5. A process according to claim 1, wherein a temperature profile is maintained such that the polyester/polycarbonate mass increases in temperature from the point of introduction into said extruder until said mass reaches a position in the interior of said extruder where a maximum temperature of said mass is attained, the temperature of said mass decreasing from said position of maximum temperature until said mass reaches the position of said die.

6. A process according to claim 5, wherein the temperature differential between said maximum temperature and the temperature of said mass at the position of said die is sufficient to enhance backpressure in said extruder to a degree whereby said carbon dioxide generated in said reaction of polyester and polycarbonate substantially remains in solution, whereby substantially all of the expansion of carbon dioxide occurs after the polyester/polycarbonate passes through the die of the extruder.

7. A process for preparing a ovenable food container which is capable of containing food therein without substantial thermal deformation when said container is placed in an oven for up to one hour at a temperature of up to 400° F., said container being a thermoformed, foamed, crystalline, plastic sheet, said sheet being essentially composed of the foamed reaction product of a polyester and a polycarbonate, said process comprising the steps of:

(i) introducing into an extruder a mixture consisting of:

(a) a high molecular weight linear polyester, which is a polycondensation product of an aromatic dicarboxylic acid and a glycol; and (b) a high molecular weight linear aromatic polycarbonate represented by the repeating structural unit of the formula:

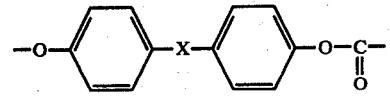

wherein x is a divalent hydrocarbon radical with a total of from 2 up to about 9 carbon atoms selected from the group consisting of

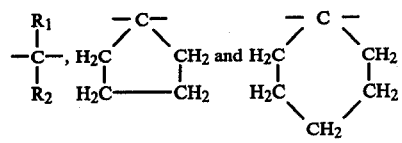

in which $R_1$ represents a member selected from the group consisting of hydrogen and lower alkyl and $R_2$ represents a member selected from the group consisting of phenyl and alkyl of 1 to 7 carbon atoms, in a weight ratio of (a):(b) of about 20:1 to 1:20;

(ii) reacting said blend of step (i) inside said extruder by providing sufficient mixing and heating to homogeneously react said polyester (a) and polycarbonate (b), thereby releasing carbon dioxide from said polycarbonate into the reacted polyester/polycarbonate mass;

(iii) passing said reacted polyester/polycarbonate mass of step (ii) through said die section of said extruder, said die section being adapted to cast said polyester/polycarbonate mass therefrom in the form of a sheet, thereby causing said released carbon dioxide to expand in said mass and reduce the density of the extruded sheet, the temperature of the extruded sheet being sufficient to cause rapid crystallization of said sheet;

(iv) passing the foamed, extruded sheet of step (iii) through one or more chill rolls, to reduce the temperature of said sheet, thereby preventing substantial crystallization of said sheet, whereby said sheet can be thermoformed, pursuant to steps (v–vii) recited hereinafter, without substantial shrinkage, the temperature of the thusly cooled sheet being substantially insufficient to cause crystallization of said sheet;

(v) heating said sheet of step (iv), said sheet not being in contact with a mold, said sheet not being subjected to forces comprising a differential in applied pressure to said sheet, said sheet being heated to a temperature sufficient to cause slow crystallization of said sheet, thereby forming a preheated sheet;

(vi) contacting said preheated sheet of step (v) with a mold by applying forces comprising a differential in applied pressure to said sheet so as to make said sheet conform to said mold, said mold being adapted to cause said sheet to attain the shape of said ovenable container, said mold being maintained at a temperature higher than that of said preheated sheet sufficient to further heat said sheet to a temperature sufficient to rapidly crystallize said sheet;

(vii) allowing said sheet of step (vi) to remain in contact with said mold for a time sufficient to provide sufficient crystallization of said sheet so as to enable the molded sheet to essentially retain its shape without substantial deformation when the, thusly, thermoformed sheet is subsequently cooled to room temperature and is then heated to 400° F. and is maintained at 400° F. for one hour; and (viii) removing said thermoformed sheet of step (vii) from said mold.

8. A process according to claim 7, wherein said sheet of step (iv) has a void volume of at least about 10% and a thickness of 40 mils or less.

9. A process according to claim 8, which is capable of producing said thermoformed, foamed crystalline platic sheet at essentially the same rate as a comparable thermoformed, non-foamed crystalline plastic sheet, said non-foamed sheet being prepared by the same process as used to produce said foamed sheet, except that the polycarbonate (b) component of the polyester/polycarbonate mixture for said foamed sheet is omitted and the die opening of said extruder is adjusted to extrude a non-foamed polyester sheet of equal thickness to the thickness of the extruded foamed polyester/polycarbonate sheet.

10. A process according to claim 7, wherein the void volume of the extruded sheet of step (iii) remains essentially constant as said sheet is subjected to said steps (iv) to (viii).

11. A process according to claim 7, wherein a temperature profile is maintained such that the polyester/polycarbonate mass increases in temperature from the point of introduction into said extruder until said mass reaches a position in the interior of said extruder where a maximum temperature of said mass is attained, the temperature of said mass decreasing from said position of maximum temperature until said mass reaches the position of said die.

12. A process according to claim 11, wherein the temperature differential between said maximum temperature and the temperature of said mass at the position of said die is sufficient to enhance backpressure in said extruder to a degree whereby said carbon dioxide generated in said reaction of polyester and polycarbonate substantially remains in solution, whereby substantially all of the expansion of carbon dioxide occurs after the polyester/polycarbonate passes through the die of the extruder.

* * * * *

UNITED STATES PATENT AND TRADEMARK OFFICE
CERTIFICATE OF CORRECTION

PATENT NO. : 4,466,933
DATED : August 21, 1984
INVENTOR(S) : MARK THOMAS HUGGARD It is certified that error appears in the above-identified patent and that said Letters Patent are hereby corrected as shown below:

Column 23, Line 14: "(ii) through said" should be --(ii) through the--

Signed and Sealed this

Fifteenth Day of January 1985

[SEAL]

Attest:

GERALD J. MOSSINGHOFF

Attesting Officer          Commissioner of Patents and Trademarks